(12) United States Patent
Vaddiraju

(10) Patent No.: US 9,770,973 B1
(45) Date of Patent: Sep. 26, 2017

(54) ENGINE COMPARTMENT ASSEMBLY AND A VEHICLE

(71) Applicant: GM GLOBAL TECHNOLOGY OPERATIONS LLC, Detroit, MI (US)

(72) Inventor: Srinivasa Rao Vaddiraju, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/212,907

(22) Filed: Jul. 18, 2016

(51) Int. Cl.
- *B60K 11/08* (2006.01)
- *B62D 25/08* (2006.01)
- *B60K 11/04* (2006.01)

(52) U.S. Cl.
CPC .............. *B60K 11/08* (2013.01); *B60K 11/04* (2013.01); *B62D 25/082* (2013.01)

(58) Field of Classification Search
CPC ......................................... B60K 11/08–11/085
See application file for complete search history.

(56) References Cited

U.S. PATENT DOCUMENTS

| | | | | |
|---|---|---|---|---|
| 6,192,838 | B1* | 2/2001 | Matsuo .................. | B60K 11/08 123/41.01 |
| 7,510,235 | B2* | 3/2009 | Kobayashi ............... | B60N 3/06 296/181.2 |
| 9,139,240 | B1* | 9/2015 | Long .................... | B62D 35/001 |
| 2012/0153681 | A1* | 6/2012 | Ajisaka .................. | B60K 11/04 296/208 |
| 2013/0244562 | A1* | 9/2013 | Maurer .................... | F01P 11/10 454/152 |
| 2014/0020968 | A1* | 1/2014 | Ikeya ....................... | B60K 1/04 180/65.31 |

\* cited by examiner

*Primary Examiner* — John Walters
*Assistant Examiner* — James Triggs
(74) *Attorney, Agent, or Firm* — Quinn IP Law

(57) ABSTRACT

An engine compartment assembly and a vehicle include an engine compartment. The engine compartment assembly and the vehicle also include an inlet configured to allow a flow of air into the engine compartment and an outlet configured to allow at least some of the flow of air out of the engine compartment. The engine compartment assembly and the vehicle further include a wall disposed closer to the outlet than the inlet. Generally, the wall extends in a manner to create an air dam which enhances the flow of air through at least part of the engine compartment. In certain embodiments, the wall extends outwardly from the belly pan away from the engine compartment to create a pressure reduction at the outlet which in turn enhances the flow of air through at least part of the engine compartment.

20 Claims, 3 Drawing Sheets

ENGINE COMPARTMENT ASSEMBLY AND A VEHICLE

TECHNICAL FIELD

The present disclosure relates to an engine compartment assembly and a vehicle.

BACKGROUND

Vehicles generally include a front grill that allows a flow of air into an engine compartment. The air can assist in cooling various components inside the engine compartment.

SUMMARY

The present disclosure provides an engine compartment assembly including an engine compartment. The engine compartment assembly also includes an inlet configured to allow a flow of air into the engine compartment and an outlet configured to allow at least some of the flow of air out of the engine compartment. The engine compartment assembly further includes a wall disposed closer to the outlet than the inlet. The wall extends in a manner to create an air dam which enhances the flow of air through at least part of the engine compartment.

The present disclosure also provides a vehicle including a body defining an engine compartment. The body also includes a belly pan defining a bottom of the engine compartment. Furthermore, the body includes an inlet configured to allow a flow of air into the engine compartment and an outlet configured to allow at least some of the flow of air out of the engine compartment. The vehicle also includes a wall disposed closer to the outlet than the inlet. The wall extends outwardly from the belly pan away from the engine compartment to create a pressure reduction at the outlet which in turn enhances the flow of air through at least part of the engine compartment.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
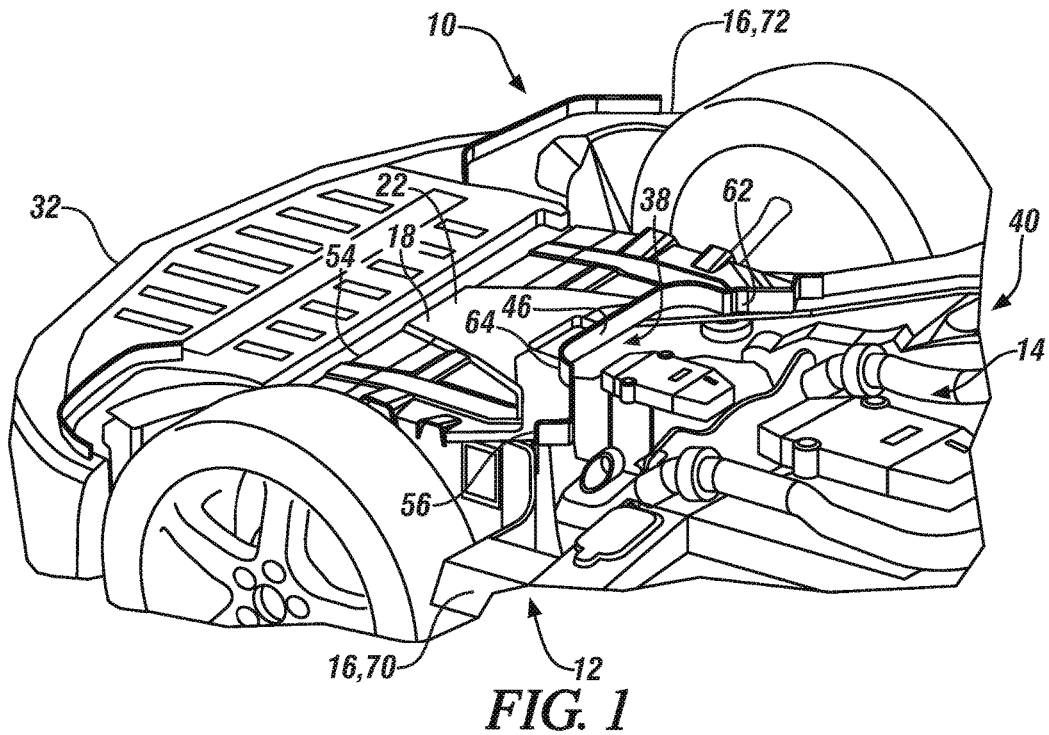
FIG. 1 is a schematic fragmentary bottom view of a vehicle and an engine compartment assembly.

Referring to the Figures, wherein like numerals indicate like or corresponding parts throughout the several views, a vehicle 10 and an engine compartment assembly 12 is generally shown in FIG. 1.

The engine compartment assembly 12 can be utilized in a vehicle application or a non-vehicle application. Hence, in certain embodiments, the vehicle 10 can include the engine compartment assembly 12. Non-limiting examples of the vehicle 10 can include cars, trucks, motorcycles, all-terrain vehicles, off-road vehicles, aircrafts, farm equipment or any other suitable vehicle.

Figure 2:
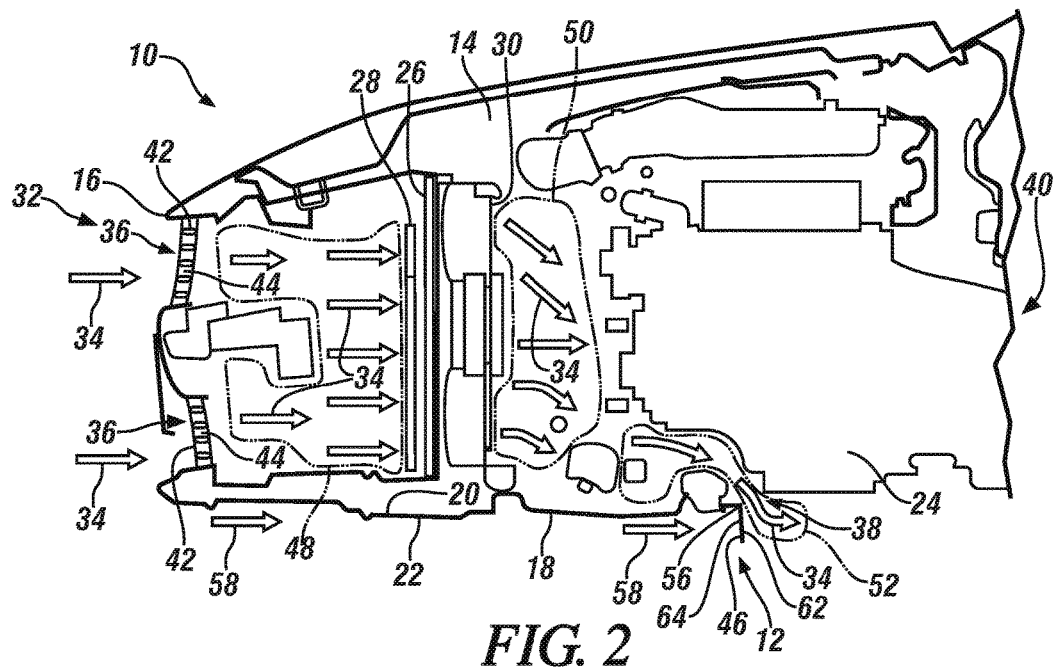
FIG. 2 is a schematic illustration of an engine compartment of the vehicle which illustrates a model of different regions of pressure.

As best shown in FIG. 2, the engine compartment assembly 12 includes an engine compartment 14. In certain embodiments, the vehicle 10 can include a body 16 that defines the engine compartment 14. Furthermore, the body 16 can include a belly pan 18 that defines a bottom of the engine compartment 14. Additionally, the belly pan 18 can include a first surface 20 facing the engine compartment 14 and a second surface 22 opposing the first surface 20 to face away from the engine compartment 14. Therefore, generally, the second surface 22 of the belly pan 18 faces the ground that the vehicle 10 travels over.

The engine compartment 14 can contain or house various components of the vehicle 10. For example, the engine compartment 14 can contain one or more component(s) such as an engine 24, a radiator 26, a condenser 28, a fan 30, etc. In various embodiments, the vehicle 10 and the engine compartment assembly 12 can include the radiator 26, the condenser 28 and the fan 30 each disposed inside the engine compartment 14. Inside the engine compartment 14 can also be referred to as under the hood to those skilled in the art.

In certain vehicle 10 applications, the radiator 26, the condenser 28 and the fan 30 can be part of a condenser, radiator and fan module (CRFM). FIG. 2 schematically illustrates one non-limiting example of the general location of the CRFM. The radiator 26 and the condenser 28 can operate as heat exchangers.

Continuing with FIG. 2, the CRFM can be disposed between a first end or front end 32 of the vehicle 10 and a passenger compartment of the vehicle 10. Generally, a flow of air (as represented by arrows 34 in FIG. 2) can enter the front end 32 of the vehicle 10 through an inlet 36 in the direction of the arrow 34 which is then directed toward the CRFM. The flow of air is created by the vehicle 10 moving in a direction opposite from the direction of the arrows 34 at the front end 32 of the vehicle 10. The air can assist in cooling various components inside the engine compartment 14 with the aid of the heat exchangers, e.g., the radiator 26 and/or the condenser 28.

The components of the CRFM can be in various locations relative to each other. For example, the condenser 28 can be disposed upstream to the radiator 26 and the fan 30 relative to the direction of the flow of the air. Furthermore, the radiator 26 can be disposed between the condenser 28 and the fan 30. As such, the fan 30 can be disposed downstream to the condenser 28 and the radiator 26 relative to the direction of the arrows 34. When the fan 30 is operated, air is expelled out of the fan 30 generally toward the passenger compartment. The air can pick up excess heat rejected by the heat exchangers, e.g., the radiator 26 and/or the condenser 28, in which the fan 30 moves the heated air away from the CRFM and the heated air is expelled out of the engine compartment 14 as discussed further below.

The engine compartment assembly 12 also includes the inlet 36 configured to allow the flow of air (again as represented by arrows 34 in FIG. 2) into the engine compartment 14 and an outlet 38 configured to allow at least some of the flow of air out of the engine compartment 14. It is to be appreciated that some of the air can exit the engine compartment 14 in other locations than the outlet 38. In certain embodiments, the body 16 can include the inlet 36 and the outlet 38. Furthermore, in certain embodiments, the engine compartment assembly 12 can include the body 16 that defines the engine compartment 14, the inlet 36 and the outlet 38.

The body 16 can include the front end 32 and a second end or back end 40 opposing the front end 32, with the inlet 36 disposed along the front end 32, and the outlet 38 disposed adjacent to the belly pan 18. As such, the outlet 38 can be disposed underneath the vehicle 10. Generally, the air enters the engine compartment 14 through the inlet 36 and then flows through the CRFM and then at least some of the air flows out of the engine compartment 14 through the outlet 38. The arrows 34 indicate the direction of the flow of air which starts through the inlet 36, then through the condenser 28, the radiator 26 and the fan 30, and then at least some of the air exits through the outlet 38. Simply stated, the air enters the engine compartment 14 through the front end 32 of the vehicle 10 and at least some of the air exits the engine compartment 14 through the outlet 38 underneath the vehicle 10. As mentioned above, it is to be appreciated that some of the air can flow into other locations of the engine compartment 14 which does not necessarily exit at the outlet 38 of FIG. 2, but instead exits the engine compartment 14 at other locations. For example, the fan 30 can direct the air to various locations in the engine compartment 14, in which at least some of the air exits the outlet 38 and some of the air does not exit the outlet 38. As such, when referring to the air exiting the outlet 38, this can include all or some of the air.

In certain embodiments, the body 16 can include a vent or a grill 42 (see FIG. 2) defining at least one opening 44 that further defines the inlet 36. The grill 42 is disposed upstream from the radiator 26, the condenser 28 and the fan 30 relative to the direction of the flow of air. Specifically, the grill 42 can be attached to the front end 32 of the body 16. Therefore, the air can enter the engine compartment 14 through the opening 44 of the grill 42. In certain embodiments, the grill 42 can include a plurality of openings 44. Furthermore, it is to be appreciated that, optionally, more than one grill 42 or vent can be utilized defining the opening(s) 44.

Continuing with FIG. 2, the engine compartment assembly 12 further includes a wall 46 disposed closer to the outlet 38 than the inlet 36. Generally, the wall 46 causes a change in the flow of air through at least part of the engine compartment 14. The wall 46 extends in a manner to create an air dam which enhances the flow of the air through at least part of the engine compartment 14. In certain embodiments, the wall 46 extends outwardly away from the engine compartment 14 to create the air dam. The wall 46 can create the air dam by blocking a flow of air (as represented by arrow 58 in FIG. 2) that is beneath the engine compartment 14, and more specifically, beneath the belly pan 18, from directly interfering with the flow of air (as represented by arrows 34 in FIG. 2) exiting at the outlet 38. As a result, there is a pressure reduction downstream of the wall 46, and additionally as a result, the flow of the air through at least part of the engine compartment 14 is enhanced (e.g., the flow rate of the air through at least part of the engine compartment 14 is increased as compared to when the wall 46 is eliminated).

The enhanced flow of air through at least part of the engine compartment 14 can occur downstream from the fan 30 relative to the direction of the flow of the air. More specifically, the wall 46 extends outwardly from the belly pan 18 away from the engine compartment 14 to create a pressure reduction at the outlet 38 which in turn enhances the flow of air through at least part of the engine compartment 14. Generally, the pressure reduction in the region downstream to the wall 46 can increase the overall flow of air, e.g., the flow rate of the air, through at least part of the engine compartment 14 (as compared to when the wall 46 is eliminated). For example, the pressure reduction can increase the overall flow of air through the grill 42 and the CRFM (as compared to when the wall 46 is eliminated); and as such, improving the flow of air through the radiator 26. In certain embodiments, the increase in the flow of air through at least part of the engine compartment 14 can occur downstream from the fan 30 relative to the direction of the flow of the air.

FIG. 2 illustrates different areas of pressure to further illustrate how the wall 46 can cause the pressure reduction discussed above. Upstream from the CRFM, a first pressure region 48 occurs, and downstream from the CRFM a second pressure region 50 occurs, with the second pressure region 50 being less than the first pressure region 48. Furthermore, FIG. 2 illustrates a third pressure region 52 at the outlet 38, with the third pressure region 52 being less than the first and second pressure regions 48, 50. For example, the first pressure region 48 can be at a high pressure, the second pressure region 50 can be at a mid-pressure and the third pressure region 52 can be at a low pressure. The low pressure at the third pressure region 52 pulls the air from the second pressure region 50 toward the outlet 38, which in turn reduces the pressure at the second pressure region 50 (as compared to when the wall 46 is eliminated). The third pressure region 52 acts as a vacuum that pulls the air from the second pressure region 50 toward the outlet 38.

As such, the reduction of pressure at the third pressure region 52 due to the wall 46 can create an increase in the flow of the air from the second pressure region 50 toward the third pressure region 52 (as compared to when the wall 46 is eliminated). As such, the reduction of pressure at the third pressure region 52 due to the wall 46 can enhance the flow of the air from the second pressure region 50 toward the third pressure region 52. The reduction of pressure at the third pressure region 52 due to the wall 46 can also create an increase in the flow of the air through at least part of the CRFM (as compared to when the wall 46 is eliminated); hence also reducing pressure in at least part of the CRFM which can improve the flow of the air through the radiator 26. For example, the pressure in the CRFM can be reduced between the condenser 28 and the radiator 26 when utilizing the wall 46. As such, generally, the wall 46 can improve the overall flow of the air through the engine compartment 14. Effectively, the wall 46 acts as a fan 30 to pull the air through the engine compartment 14 and out the outlet 38. Additionally, by utilizing the wall 46, the size of the grill 42 can be decreased which can reduce aerodynamic drag.

Generally, the wall 46 is disposed proximal to the belly pan 18. The wall 46 can be fixed to the belly pan 18 adjacent to the outlet 38 and extends outwardly away from the belly pan 18 toward the ground. The belly pan 18 can include a first edge 54 facing the inlet 36 and a second edge 56 opposing the first edge 54. The second edge 56 can be disposed adjacent to the outlet 38, and in certain embodiments, the wall 46 is attached to the second edge 56.

The wall 46 is disposed upstream to the outlet 38 relative to the direction of the flow of the air as represented by the arrows 34 in FIG. 2. When the vehicle 10 is moving in the direction opposite the arrows 34 at the front end 32 of the vehicle 10, air also moves around the outside of the vehicle 10. As such, the wall 46 extends outwardly away from the engine compartment 14 to block a flow of air (as represented by arrow 58 in FIG. 2) that is beneath the belly pan 18 from interfering with the flow of air (arrows 34) at the outlet 38 which assists in allowing the pressure reduction at the outlet 38 which in turn enhances the flow of air through at least part of the engine compartment 14. Therefore, the air can exit the outlet 38 without direct interference from the flow of the air (arrow 58) that occurs outside of the vehicle 10, and more specifically, outside of the body 16. As such, the flow of air that occurs outside of the vehicle 10, can be beneath the belly pan 18, and thus, beneath the engine compartment 14.

The wall 46 can be fixed or attached to the belly pan 18, and in certain embodiments the second edge 56, by any suitable methods. Furthermore, the wall 46 and the belly pan 18 can be two separate pieces or can be integrally formed as one piece. For example, the wall 46 and the belly pan 18 can be fixed to each other by adhesive, welding, molding, forming, casting, fasteners, clips, tabs, couplers, friction fit, interference fit, etc. As such, the wall 46 can be fixed or attached to the belly pan 18 or the second edge 56 by any of the above methods or any other suitable methods.

The wall 46 can be various configurations and some non-limiting examples are illustrated in FIGS. 1 and 3-5. As discussed above, the wall 46 extends outwardly away from the belly pan 18. Generally, as shown in FIGS. 1 and 3-7, the wall 46 extends outwardly relative to the belly pan 18 at an angle 60 that is greater than 0 degrees and less than 180 degrees.

Figure 6:
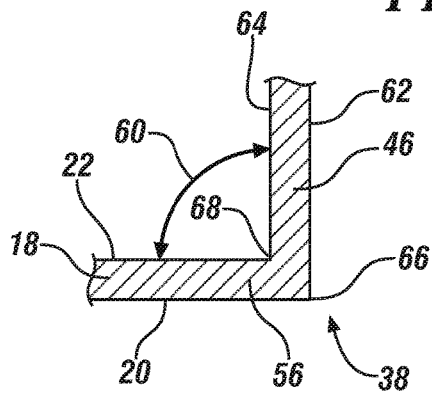
FIG. 6 is a schematic fragmentary cross-sectional view of the belly pan and the wall of the configuration of FIG. 3.
Figure 7:
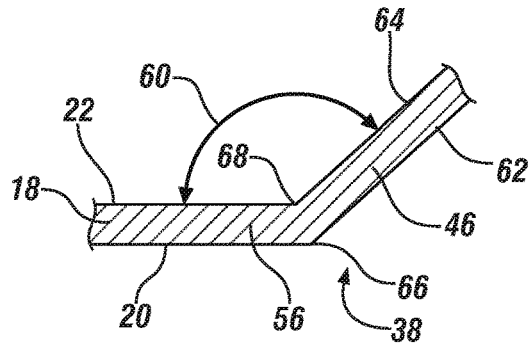
FIG. 7 is a schematic cross-sectional view of the belly pan and the wall of the configuration of FIG. 5.

The wall 46 can include a first side surface 62 and a second side surface 64 opposing the first side surface 62. Additionally, as discussed above, the belly pan 18 can include the first surface 20 facing the engine compartment 14 and the second surface 22 opposing the first surface 20 to face away from the engine compartment 14. Therefore, the second surface 22 of the belly pan 18 can face the ground. As best shown in FIGS. 6 and 7, the first side surface 62 of the wall 46 and the first surface 20 of the belly pan 18 can meet at a first corner 66 and the second side surface 64 of the wall 46 and the second surface 22 of the belly pan 18 can meet at a second corner 68.

Figure 3:
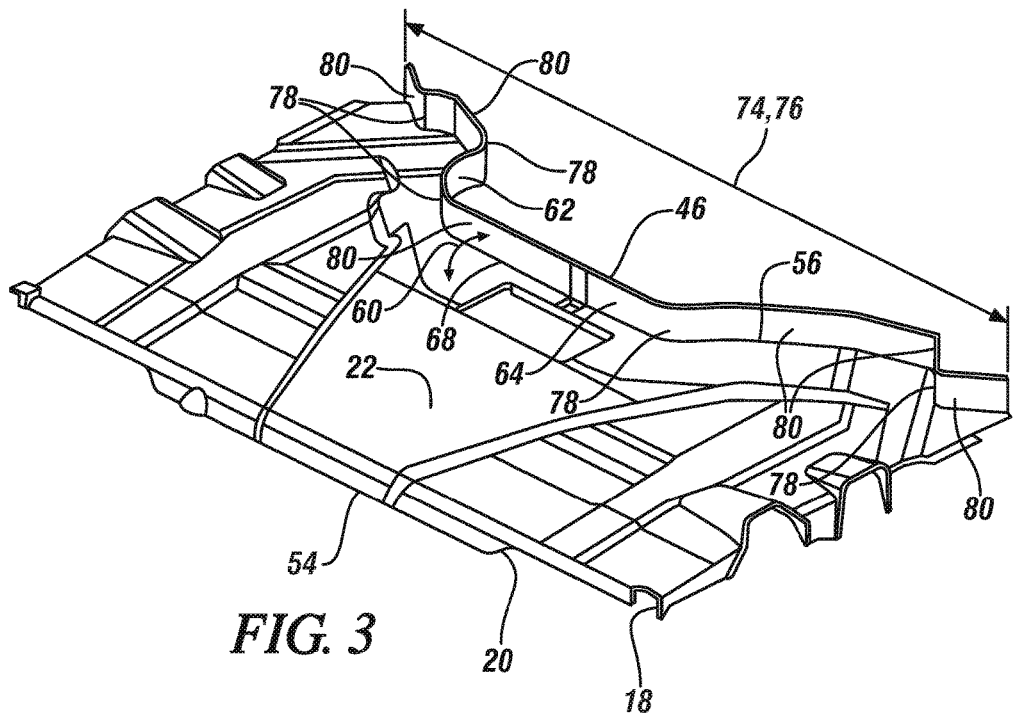
FIG. 3 is a schematic perspective bottom view of a belly pan and a wall in a first configuration as similarly shown in FIG. 1.
Figure 4:
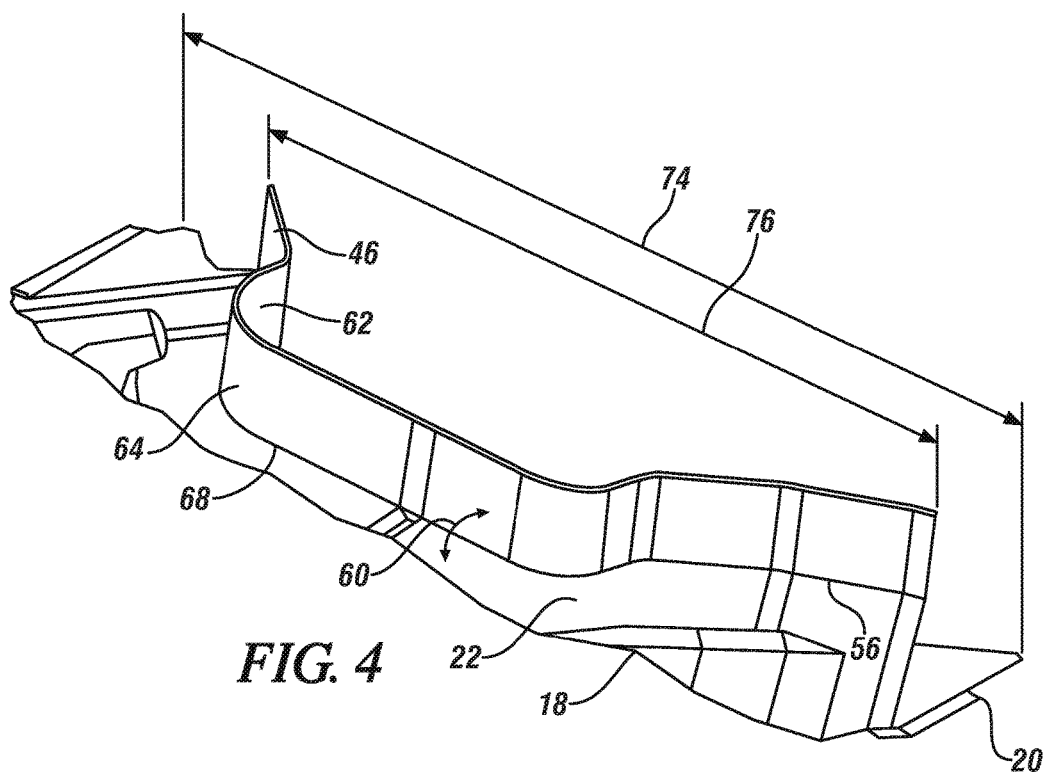
FIG. 4 is a schematic fragmentary perspective bottom view of the belly pan, with the wall in a second configuration.
Figure 5:
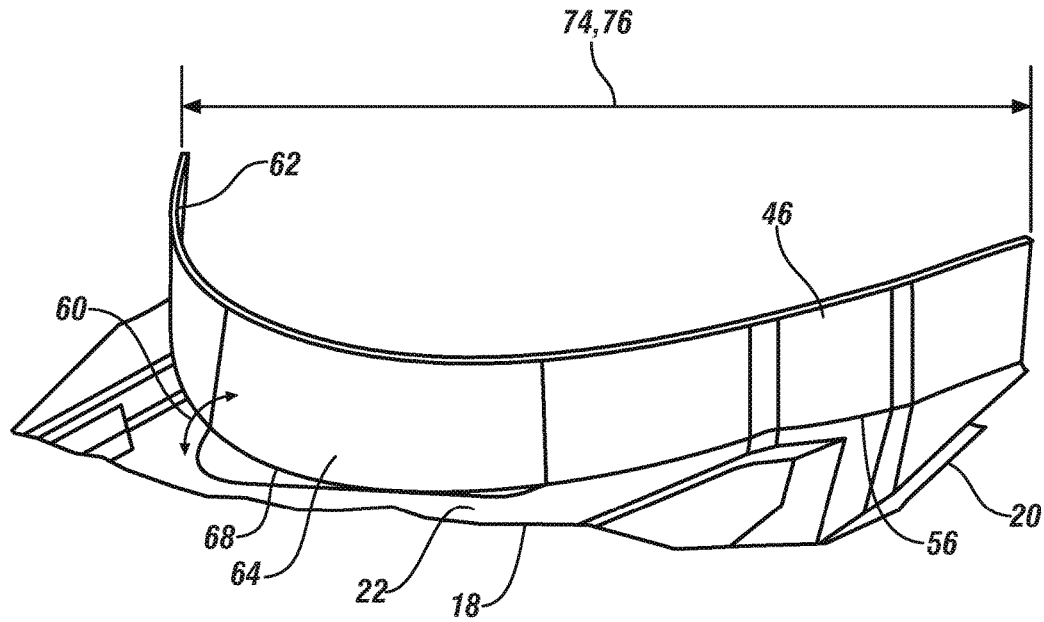
FIG. 5 is a schematic fragmentary perspective bottom view of the belly pan, with the wall in a third configuration.

The angle 60 created by the wall 46 and the belly pan 18 can be between the second side surface 64 and the second surface 22. Therefore, the second side surface 64 of the wall 46 and the second surface 22 of the belly pan 18 can cooperate to present the angle 60 greater than 0 degrees and less than 180 degrees. Simply stated, the wall 46 extends outwardly from the belly pan 18 in a different plane than the second edge 56. In certain embodiments, the angle 60 can be an oblique angle. In the embodiments of FIGS. 4, 5 and 7, the angle 60 can be an obtuse angle. In the embodiment of FIGS. 3 and 6, the angle 60 can be a substantially right angle. In other words, for the embodiment of FIGS. 3 and 6, the angle 60 can be a substantially perpendicular angle.

Turning back to FIG. 1, the body 16 can include a first side 70 and a second side 72 opposing the first side 70. The first and second sides 70, 72 can be disposed adjacent to the front and back ends 32, 40 such that the sides 70, 72 and the ends 32, 40 cooperate to define a periphery of the body 16. Generally, the first and second sides 70, 72 (of the body 16) are spaced from each other in a cross-car direction.

The wall 46 can extend across the vehicle 10 in the cross-car direction to any suitable length, and FIGS. 1 and 3-5 illustrate non-limiting examples. Generally, the second edge 56 of the belly pan 18 can extend a first length 74 in the cross-car direction and the wall 46 can extend a second length 76 in the cross-car direction. In the embodiments of FIGS. 3 and 5, the first and second lengths 74, 76 can be substantially the same. In the embodiment of FIG. 4, the second length 76 can be less than the first length 74. It is to be appreciated that the second length 76 of the wall 46 for the embodiments of FIGS. 3 and 5 can optionally be the less than the first length 74 of the second edge 56 of the belly pan 18. Furthermore, it is to be appreciated that optionally the first and second lengths 74, 76 can be substantially the same for the embodiment of FIG. 4.

Furthermore, in certain embodiments, such as in FIG. 5, the first side surface 62 of the wall 46 faces generally toward the front end 32, and the first side surface 62 can have a substantially arcuate configuration. Simply stated, the first side surface 62 of the wall 46, in the cross-car direction, can be substantially arcuate as shown in FIG. 5. In other embodiments, such as FIGS. 3 and 4, the first side surface 62 can have a substantially arcuate configuration and a substantially flat configuration adjacent to the substantially arcuate configuration. Furthermore, in FIGS. 3 and 4, the wall 46 can have a plurality of substantially arcuate configurations and a plurality of substantially flat configurations. As such, the first side surface 62 of the wall 46, in the cross-car direction, can include substantially arcuate portion(s) 78 and substantially flat portion(s) 80, some of which are labeled in FIG. 3 for illustrative purposes only.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. An engine compartment assembly comprising:
    an engine compartment;
    an inlet configured to allow a flow of air into the engine compartment;
    an outlet configured to allow at least some of the flow of air out of the engine compartment; and
    a wall disposed closer to the outlet than the inlet, with the wall extending outwardly beyond the outlet such that the outlet is recessed behind the wall to create an air dam which enhances the flow of air through at least part of the engine compartment.

2. The assembly as set forth in claim 1 wherein the wall extends outwardly away from the engine compartment to a distal end, and the outlet is recessed behind the distal end such that the wall creates the air dam.

3. The assembly as set forth in claim 2 further including a body defining the engine compartment, the inlet and the outlet, and wherein the body includes a belly pan defining a bottom of the engine compartment, and the wall is disposed proximal to the belly pan.

4. The assembly as set forth in claim 3 wherein the belly pan includes a first surface facing the engine compartment and a second surface opposing the first surface to face away from the engine compartment, and wherein the wall includes a first side surface and a second side surface opposing the first side surface, and wherein the second side surface of the wall and the second surface of the belly pan cooperate to present an angle greater than 0 degrees and less than 180 degrees.

5. The assembly as set forth in claim 4 wherein the angle is an obtuse angle.

6. The assembly as set forth in claim 4 wherein the angle is a substantially right angle.

7. The assembly as set forth in claim 3 wherein the wall is fixed to the belly pan adjacent to the outlet, and wherein the wall extends outwardly away from the engine compartment to block a flow of air that is beneath the belly pan from interfering with the flow of air at the outlet which assists in allowing a pressure reduction at the outlet which in turn enhances the flow of air through at least part of the engine compartment.

8. The assembly as set forth in claim 3 wherein the body includes a front end and a back end opposing the front end, with the inlet disposed along the front end, and wherein the wall includes a first side surface facing generally toward the front end, with the first side surface having a substantially arcuate configuration.

9. The assembly as set forth in claim 8 wherein the first side surface has the substantially arcuate configuration and a substantially flat configuration adjacent to the substantially arcuate configuration.

10. The assembly as set forth in claim 3 wherein the belly pan includes a first edge facing the inlet and a second edge opposing the first edge, with the second edge disposed adjacent to the outlet, and the wall is attached to the second edge.

11. The assembly as set forth in claim 10 wherein the second edge of the belly pan extends a first length and the wall extends a second length, and wherein the first and second lengths are substantially the same.

12. The assembly as set forth in claim 10 wherein the second edge of the belly pan extends a first length and the wall extends a second length, and wherein the second length is less than the first length.

13. The assembly as set forth in claim 10 wherein:
the body includes a front end and a back end opposing the front end, with the inlet disposed along the front end;
the body includes a first side and a second side opposing the first side, with the first and second sides disposed adjacent to the front and back ends such that the sides and the ends cooperate to define a periphery of the body;
the first and second sides are spaced from each other in a cross-car direction; and
the second edge of the belly pan extends a first length in the cross-car direction and the wall extends a second length in the cross-car direction.

14. The assembly as set forth in claim 13 wherein the first and second lengths are substantially the same.

15. The assembly as set forth in claim 13 wherein the second length is less than the first length.

16. The assembly as set forth in claim 1 further including a radiator, a condenser and a fan each disposed inside the engine compartment, with a direction of the flow of air starting through the inlet, then through the condenser, the radiator and the fan, and then at least some of the air exiting through the outlet, and wherein the enhanced flow of air through at least part of the engine compartment occurs downstream from the fan relative to the direction of the flow of the air.

17. The assembly as set forth in claim 16 further including a body defining the engine compartment, and wherein the body includes a grill defining at least one opening that further defines the inlet, and wherein the grill is disposed upstream from the radiator, the condenser and the fan relative to the direction of the flow of air.

18. A vehicle comprising:
a body defining an engine compartment;
wherein the body includes a belly pan defining a bottom of the engine compartment;
wherein the body includes an inlet configured to allow a flow of air into the engine compartment and an outlet configured to allow at least some of the flow of air out of the engine compartment; and
a wall disposed closer to the outlet than the inlet, with the wall extending outwardly from the belly pan away from the engine compartment such that the wall extends outwardly further than the belly pan to block part of the outlet which creates a pressure reduction at the outlet which in turn enhances the flow of air through at least part of the engine compartment.

19. The vehicle as set forth in claim 18 wherein the wall is fixed to the belly pan adjacent to the outlet such that the outlet is recessed behind the wall, wherein the wall blocks a flow of air that is beneath the belly pan from interfering with the flow of air at the outlet which assists in allowing the pressure reduction at the outlet.

20. The vehicle as set forth in claim 18 further including a radiator, a condenser and a fan each disposed inside the engine compartment, with a direction of the flow of air starting through the inlet, then through the condenser, the radiator and the fan, and then at least some of the air exiting through the outlet, and wherein the increase in the flow of air through at least part of the engine compartment occurs downstream from the fan relative to the direction of the flow of the air.

\* \* \* \* \*